United States Patent
Kim et al.

(10) Patent No.: US 8,296,425 B2
(45) Date of Patent: Oct. 23, 2012

(54) METHOD AND SYSTEM FOR LAWFUL INTERCEPTION OF INTERNET SERVICE

(75) Inventors: Junghak Kim, Daejeon (KR); Song In Choi, Daejeon (KR); Sook Jin Lee, Daejeon (KR); Jee Hwan Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 212 days.

(21) Appl. No.: 12/887,896

(22) Filed: Sep. 22, 2010

(65) Prior Publication Data

US 2011/0145396 A1    Jun. 16, 2011

(30) Foreign Application Priority Data

Dec. 14, 2009 (KR) .......................... 10-2009-0124152
Mar. 18, 2010 (KR) .......................... 10-2010-0024222

(51) Int. Cl.
G06F 15/16 (2006.01)
G06F 15/173 (2006.01)

(52) U.S. Cl. .......................... 709/224; 709/203; 709/223

(58) Field of Classification Search .................. 709/202, 709/224; 705/64; 713/184, 186
See application file for complete search history.

(56) References Cited

U.S. PATENT DOCUMENTS

| 7,283,521 | B1 | 10/2007 | Ryan | |
|---|---|---|---|---|
| 7,447,909 | B2 | 11/2008 | Reith | |
| 2002/0029342 | A1* | 3/2002 | Keech | 713/184 |
| 2002/0059146 | A1* | 5/2002 | Keech | 705/64 |
| 2006/0224898 | A1* | 10/2006 | Ahmed | 713/186 |
| 2009/0300093 | A1* | 12/2009 | Griffiths et al. | 709/202 |
| 2011/0145396 | A1* | 6/2011 | Kim et al. | 709/224 |

FOREIGN PATENT DOCUMENTS

KR    10-2009-0090940    8/2009

* cited by examiner

*Primary Examiner* — Quang N. Nguyen
(74) *Attorney, Agent, or Firm* — Staas & Halsey LLP

(57) ABSTRACT

In a lawful interception system including an interception unit, an application service providing unit, and an Internet access service providing unit, the application service providing unit may receive, from the interception unit, an interception request including interception target information of an interception target. Next, the application service providing unit may transfer a user code corresponding to the received interception target information to the interception unit, and may insert user related information into a packet to be provided to the interception target corresponding to the user code, enabling the packet to be lawfully intercepted. The interception unit may request the Internet access service providing unit for an interception of the packet with respect to the interception target by including the user code.

8 Claims, 5 Drawing Sheets

FIG.4A

| Version | IHL | Type of Service | Total Length |
|---------|-----|-----------------|--------------|
| ⋮ ||||
| Source Address ||||
| Destination Address ||||
| Option (Max. 40bytes) ⋮ ||||

FIG.4B

| Version | IHL | Type of Service | Total Length |
|---------|-----|-----------------|--------------|
| ⋮ ||||
| Source Address ||||
| Destination Address ||||
| User Related Information (Max. 40bytes) ⋮ ||||

METHOD AND SYSTEM FOR LAWFUL INTERCEPTION OF INTERNET SERVICE

CROSS-REFERENCE TO RELATED APPLICATION

This application claims priority to and the benefit of Korean Patent Application Nos. 10-2009-0124152 and 10-2010-0024222 filed in the Korean Intellectual Property Office on Dec. 14, 2009 and Mar. 18, 2010, the entire contents of which are incorporated herein by reference.

BACKGROUND OF THE INVENTION (a) Field of the Invention

The present invention relates to a method and system for a lawful interception of Internet services.

b) Description of the Related Art

A lawful interception indicates a behavior of lawfully intercepting, by means of a law enforcement agency granted with a legal right, a communication traffic occurring from any target or transferred to the target. In this instance, the lawful interception may need cooperation of a communication service provider. Particularly, the United States congress has passed and been operating a Communications Assistance for Law Enforcement Act (CALEA), enabling the communication service provider to cooperate with the lawful interception.

Using the Internet, an e-mail service, a web-based information service, e-commerce, a broadcasting service, a telephone service, and the like have been generalized. In addition, Internet application service providers providing various types of services using the Internet are also increasing. Accordingly, lawful interception technology may need to expand its scope to monitor servers of all the service providers connected to the Internet, beyond monitoring only a path for connection to the Internet that is an interception target.

A method of lawfully intercepting a router or a gateway of an Internet access service provider providing a line for a user to access the Internet, or a method of lawfully intercepting a communication traffic transferred via a server of an Internet application service provider providing various types of services via the Internet, such as an e-mail service, a web-based information service, e-commerce, a broadcasting service, and a telephone service, may be classified into a passive method and an active method.

The passive method denotes a scheme that may filter only a communication line associated with a router or a gateway of an Internet access service provider connected by a corresponding user, or only communication data and communication connection information associated with a router or a gateway of an Internet access service provider connected with a server of an Internet application service provider, and may transfer the filtered information to a law enforcement agency.

The active method denotes a scheme that may filter only communication data and communication connection information associated with an interception target among communication packets processed directly by unifying and thereby operating an interception function included in the router or the gateway of the Internet access service provider and the server of the Internet application service provider, and may transfer the filtered information to the law enforcement agency.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and system for a lawful interception of Internet services. More particularly, an exemplary embodiment of the present invention provides a method for a lawful interception of Internet services that may easily obtain a packet associated with an interception target being transferred via the Internet, and thereby may efficiently intercept the packet.

An exemplary embodiment of the present invention provides a method for a lawful interception of an Internet service at a system including an interception unit, an application service providing unit, and an Internet access service providing unit, the method including: receiving, by the application service providing unit, an interception request comprising interception target information of an interception target from the interception unit; transferring, by the application service providing unit, a user code corresponding to the received interception target information to the interception unit; inserting, by the interception unit, user related information into a packet to be provided to the interception target corresponding to the user code, enabling the packet to be lawfully intercepted; and requesting, by the interception unit, the Internet access service providing unit for an interception of the packet with respect to the interception target by including the user code.

Another exemplary embodiment of the present invention provides a system for a lawful interception of an Internet service, the system including: an interception unit for storing a legal right for an interception of a packet, and requesting an interception with respect to an interception target; an application service providing unit transferring a user code with respect to the interception target to the interception unit when an interception request is received from the interception unit; and an Internet access service providing unit for lawfully intercepting the packet when the interception request is received from the interception unit, and extracting interception information from the packet containing the user code, and providing the interception information to the interception unit.

BRIEF DESCRIPTION OF THE DRAWINGS

FIG. 4A and FIG. 4B are exemplary diagrams of an Internet protocol (IP) packet header for a lawful interception according to an exemplary embodiment of the present invention.

DETAILED DESCRIPTION OF THE EMBODIMENTS

Figure 1:
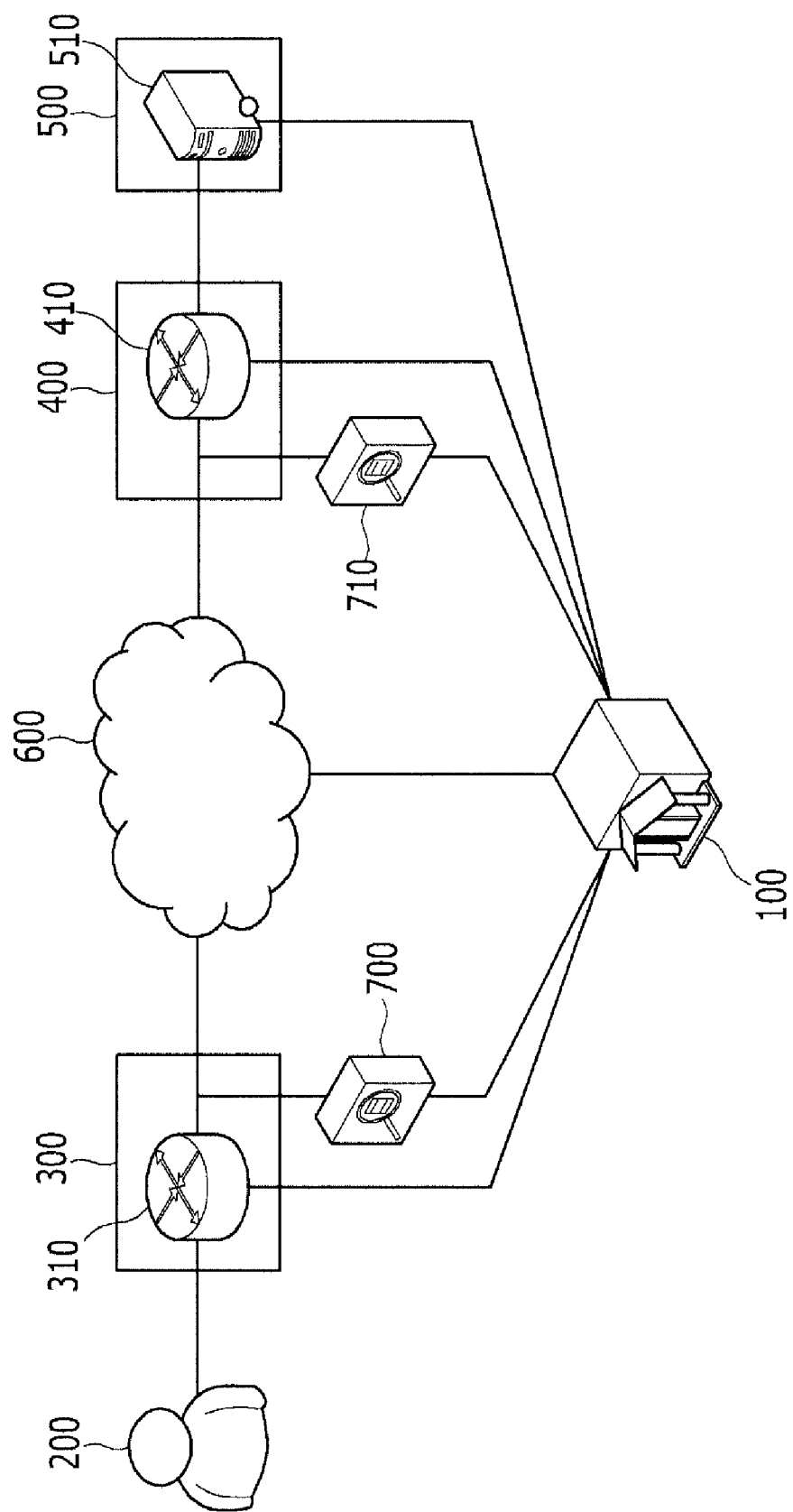
FIG. 1 is an exemplary diagram of a network system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In specification, In addition, unless explicitly described to the contrary, the word "comprise" and variations such as "comprises" or "comprising", will be understood to imply the inclusion of stated elements but not the exclusion of any other elements.

Hereinafter, a method for a lawful interception according to an exemplary embodiment of the present invention will be described in detail with reference to the accompanying drawings.

Figure 2:
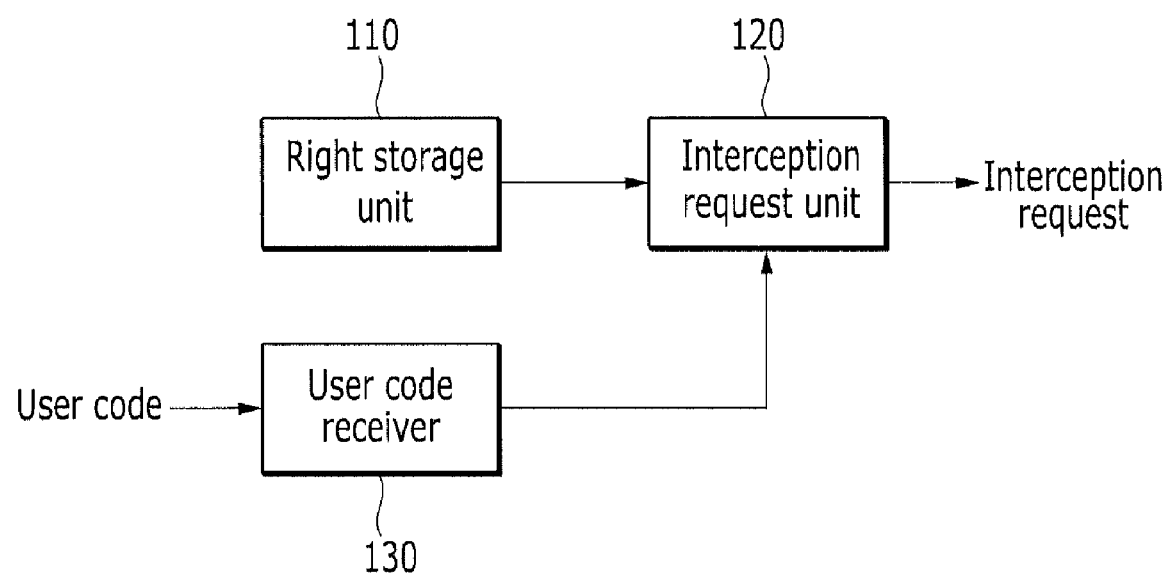
FIG. 2 is a configuration diagram of an interception unit according to an exemplary embodiment of the present invention.

FIG. 1 is an exemplary diagram of a network system according to an exemplary embodiment of the present invention. FIG. 2 is a configuration diagram of an interception unit according to an exemplary embodiment of the present invention, and FIG. 3 is a configuration diagram of an application service providing unit according to an exemplary embodiment of the present invention.

As shown in FIG. 1, in a system for performing a lawful interception according to an exemplary embodiment of the present invention, an interception unit 100, an interception target 200, or an application service providing unit 500 is connected to Internet access service providing units 300 and 400 providing a line for access to an Internet 600 through internet, respectively.

As shown in FIG. 2, the interception unit 100 may include a right storage unit 110, an interception request unit 120, and a user code receiver 130. The interception unit 100 may be a Law Enforcement Agency (LEA).

Figure 3:
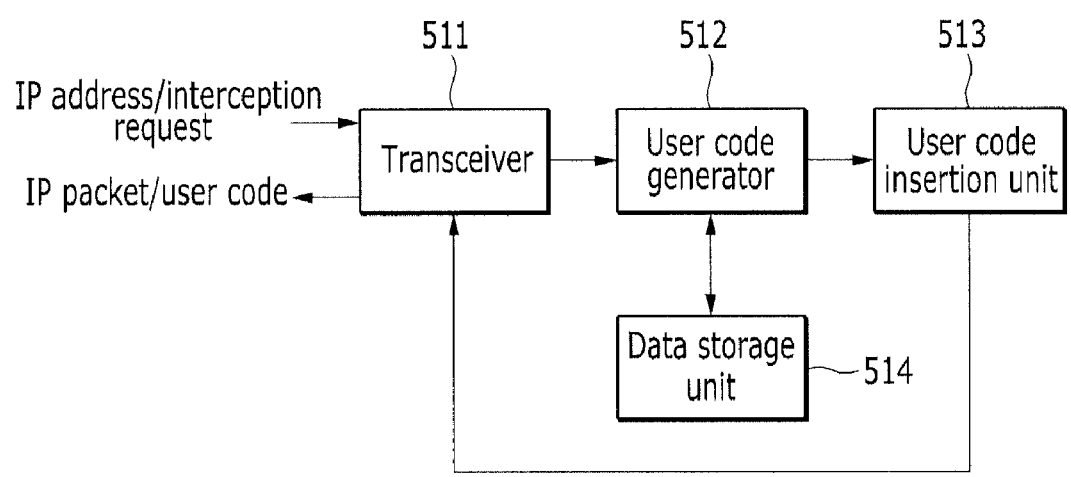
FIG. 3 is a configuration diagram of an application service providing unit according to an exemplary embodiment of the present invention.

As shown in FIG. 3, the application service providing unit 500 may include a transceiver 511, a user code generator 512, a user code insertion unit 513, and a data storage unit 514. Constituent elements of the application service providing unit 500 may be included in a server 510.

The interception unit 100 may intercept a communication traffic occurring from any interception target 200 or communication traffic transferred to the interception target 200, or may instruct the interception. For this, the right storage unit 110 may receive an issuance of a warrant from a court to achieve and store a legal right. In this instance, the interception unit 100 may perform a role as an LEA, not an apparatus of capturing a packet of the interception target 200 within an apparatus providing a network access service.

The interception request unit 120 may transfer, to the Internet access service providing units 300 and 400 or the application service providing unit 500, an interception request for lawfully intercepting the communication traffic. Specifically, the interception unit 100 may transfer, to the application service providing unit 500, a legal command and interception target information to intercept communication traffic associated with the interception target 200, and may request the Internet access service providing units 300 and 400 for the interception by including the legal command and a user code.

In this instance, the Internet access service providing units 300 and 400 may operate a router 310 or a gateway 410 (hereinafter, router/gateway for ease of description) to provide a line. The application service providing unit 500 may operate the server 510 to provide application services.

The user code receiver 130 may receive a user code of the interception target 200 from the application service providing unit 500. The user code may be generated by the application service providing unit 500 when a user logs in the application service providing unit 500 using a login identifier (ID) or a certificate required to use an Internet application service. Specifically, the user code indicates Internet application service access information or user authentication information, making it possible to identify the interception target 200.

The interception unit 100 enables the Internet access service providing units 300 and 400, and the application service providing unit 500 to operate a lawful interception function in the router/gateway 310 and 410, and the server 510. Through this, the interception unit 100 may filter and obtain only communication data and communication connection information associated with the interception target 200 among communication packets directly processed therein.

Also, the interception unit 100 may operate network probes 700 and 710 including a lawful interception function to thereby obtain and analyze all the communication packets flowing in a communication line associated with the router/gateway 310 of the Internet access service providing unit 300 connected by the interception target 200, or a communication line associated with the router/gateway 410 of the Internet access service providing unit 400 connected with the server 510 of the application service providing unit 500. Also, the interception unit 100 may filter and obtain only communication data and communication connection information associated with the interception target 200.

The interception target 200 may access the Internet 600 via the router/gateway 310 of the Internet access service providing unit 300. When the interception target 200 desires to use an Internet application service, the interception target 200 may need to access the server 510 of the application service providing unit 500. In this instance, the interception target 200 may access the server 510 through a procedure of authenticating the interception target 200 using a login ID and a password, a certificate, and the like.

As shown in FIG. 3, when the interception target 200 logs in, the transceiver 511 of the application service providing unit 500 providing a variety of services such as an e-mail service, a web-based information service, e-commerce, and the like may obtain an IP address of the interception target 200. The obtained IP address may be stored in the data storage unit 514, and the IP address may vary depending on an Internet access point of the Interception target 200.

The user code generator 512 may generate a user code based on the IP address received via the transceiver 511, and the generated user code may be stored in the data storage unit 514. The generated user code may be transferred to the interception unit 100 so that interception may be performed based on the user code of the interception target 200. In this instance, the user code may be newly updated at predetermined time intervals. Every time the user code is updated, the updated user code may be stored in the data storage unit 514 and be transferred to the interception unit 100.

When an interception request is received from the interception unit 100, the user code insertion unit 513 may insert, into a header of an IP packet, the user code generated by the user code generator 512 and a pre-stored Internet application service providing unit code.

Hereinafter, a head of an IP packet enabling a packet of an interception target to be efficiently obtained when the interception unit 100 performs an interception will be described with reference to FIG. 4A and FIG. 4B.

FIG. 4A and FIG. 4B are exemplary diagrams of an IP packet header for a lawful interception according to an exemplary embodiment of the present invention.

As shown in FIG. 4A, an option field of the IP packet header is generally used to add a particular function according to a characteristic of a program. Also, the option field may use a maximum of 40 bytes.

As shown in FIG. 4B, a method for a lawful interception according to an exemplary embodiment of the present invention may use a portion of or all of the option field of the IP packet header as a user related information field to transfer user related information. Here, the user related information may correspond to a user code generated by the user code generator 512.

Accordingly, when an IP packet is generated at the server 510 providing an Internet application service, information associated with a user corresponding to a point where the IP packet is finally transferred may be inserted into the user related information field. In this instance, a user code may be inserted into each of IP packets generated at the server 510 to exclude specificity.

Specifically, a user ID of a user registered to the data storage unit 514 of the server 510 may be inserted into the user related information field, or a user code representing the user may be inserted into the user related information field. Although description is made using an example of inserting the user code here, it is only an example and thus the present invention is not limited thereto. The user code may classify users registered to the server 510 using a bit code form. The user code may be used to prevent a specific user from being exposed through information contained in the user related information field.

When an interception request is received from the interception unit 100, the application service providing unit 500 may transfer, to the interception unit 100, a user ID or a user code associated with the interception target 200 among login IDs of users stored in the data storage unit 514 of the server 510 or user codes generated by the user code generator 512.

Each user code may be changed at predetermined intervals by means of the server 510. Every time the user code is changed, the application service providing unit 500 may need to transfer, to the interception unit 100, the user code changed in association with the interception target 200.

In addition to the user code, an application service providing unit code for identifying the application service providing unit 500 or the server 510 connected by the user may be inserted into the user related information field. When a request is received from the interception unit 100, the application service providing unit 500 may transfer, to the interception unit 100, both the user code and the application service providing unit code.

When a request is received from the interception unit 100, an interception unit code representing the interception unit 100 may be additionally inserted into the user related information field. This is to cope with a case where each of a plurality of interception units 100 may transfer, to the application service providing unit 500, an interception request that is a legal command for a lawful interception.

The interception unit code may be determined by the application service providing unit 500, and a different interception unit code may be allocated to each of the interception units 100. In addition, a mapping relationship between an interception unit code and a corresponding interception unit should not be exposed among the plurality of interception units. When a request is received from the interception unit 100, the application service providing unit 500 may transfer the interception unit code to the corresponding interception unit 100.

Hereinafter, a procedure of performing a lawful interception using the aforementioned system environment and IP packet header will be described with reference to FIG. 5.

Figure 5:
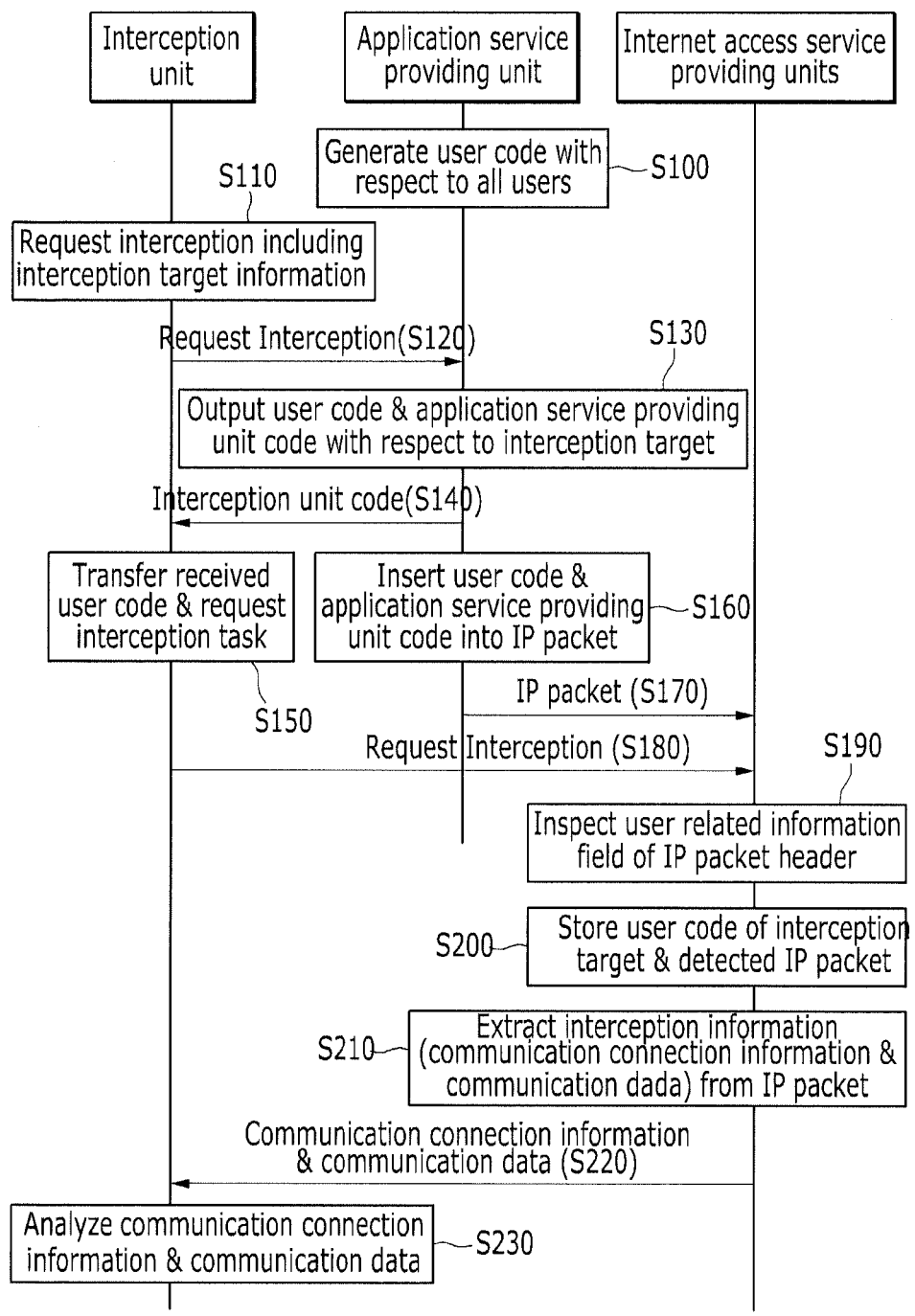
FIG. 5 is a flowchart of a lawful interception according to an exemplary embodiment of the present invention.

FIG. 5 is a flowchart of a lawful interception according to an exemplary embodiment of the present invention.

As shown in FIG. 5, in operation S100, the user code generator 512 of the application service providing unit 500 may generate a user code with respect to all the users accessing the server 510 to use an Internet application service. The user code may classify users registered to the server 510 using a bit code form, and be used to identify a corresponding user such as a real name or a residence number of each user registered to the server 510.

The user code may be generated based on an IP address of a user when the user accesses the server 510 to use the Internet application service, or may be randomly generated. Description related to a method of generating the user code will be omitted here. The user code may be used instead of a user ID used for the user to access the server 510.

The interception unit 100 may provide the application service providing unit 500 with interception target information used to identify the interception target 200, for example, a real name or a residence number of the interception target 200 used for the interception target 200 to use the Internet application service. The interception unit 100 may request an interception for cooperation with a lawful interception task with respect to the interception target 200 (S110 and S120).

The application service providing unit 500 may transfer, to the interception unit 100, a user code replacing interception target information of the interception target 200 registered to the data storage unit 514, based on interception target information that may be used to identify the interception target 200, provided from the interception unit 100 (S130 and S140). The application service providing unit 500 may also transfer, to the interception unit 100, an application service providing unit code for identifying the application service providing unit 500 and the server 510 accessed by the user.

The interception unit 100 may transfer the user code of the interception target 200 obtained from the application service providing unit 500, to the Internet access service providing unit 300 providing the Internet access service to the interception target 200 and the Internet access service providing unit 400 providing the Internet access service to the application service providing unit 500, to thereby perform a lawful interception task with respect to the interception target 200 (S150 and S180).

Also, the interception unit 100 may also perform the lawful interception task using the network probes 700 and 710. In this case, the interception unit 100 may directly input, into the network probes 700 and 710, a user code connected by the interception target 200. The network probes 700 and 710 may be enabled to intercept only a packet containing the input user code. Although an interception is requested to the Internet access service providing units 300 and 400 herein, it is only an example and thus the present invention is not limited thereto.

When IP packets to be transmitted to all the users including the interception target 200 are generated, the user code insertion unit 513 of the application service providing unit 500 may insert user related information into a user related information field of each of the IP packets to thereby output the IP packets (S160 and S170). Here, the user related information field may use a portion of or all of an option field of an IP packet header.

The user related information may include a user code registered to the data storage unit 514 of the server 510. In addition to the user code, the user related information may also include an application service providing unit code to identify the application service providing unit 500. Also, when a request is received from the interception unit 100, an interception unit code identifying the interception unit 100 may also be included in the user related information.

The router/gateway 310 and 410 of the Internet access service providing units 300 and 400 where a lawful interception function is unified and operated, or the network probes 700 and 710 operated by the interception unit 100 may inspect all the user related information fields of the IP packet header (S190). When the Internet application service providing unit code and the user code associated with the interception target 200 are detected, the router/gateway 310 and 410 or the network probes 700 and 710 may determine that a corresponding IP packet belongs to the interception target 200, and may copy and store the IP packet in a temporary storage unit within the Internet access service providing units 300 and 400 (S200).

Next, the router/gateway 310 and 410 or the network probes 700 and 710 may analyze the stored IP packets of the interception target 200 through the lawful interception function unified or included therein. The router/gateway 310 and 410 or the network probes 700 and 710 may extract and transfer interception information according to a request of the interception unit 100 (S210 and S220). Here, the interception information indicates communication connection information for an Internet application service access of an interception target in the IP packets of the interception target, and communication data associated with an Internet application service.

Here, the communication connection information may include information extracted from the IP packet header, for example, an Internet application service accessed by the interception target, a user ID, an IP address allocated to the interception target, an IP address associated with the interception target and the like. Also, the communication data indicates service content such as mail content or a call content of the interception target. The interception unit 100 may analyze the communication connection information and communication data of the interception target 200 (S230).

According to exemplary embodiments of the present invention, when a packet of an interception target is desired to be obtained, the packet of the interception target may be easily achieved without a need to closely analyze the packet and thus it is possible to efficiently perform an interception.

The above-mentioned exemplary embodiments of the present invention are not embodied only by an apparatus and method. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a lawful interception of an Internet service at a system comprising an interception unit, an application service providing unit, and an Internet access service providing unit, the method comprising:

receiving, by the application service providing unit, an interception request comprising interception target information of an interception target from the interception unit;

transferring, by the application service providing unit, a user code corresponding to the received interception target information to the interception unit;

inserting, by the interception unit, user related information into a packet to be provided to the interception target corresponding to the user code, enabling the packet to be lawfully intercepted;

requesting, by the interception unit, the Internet access service providing unit for an interception of the packet with respect to the interception target by including the user code;

inspecting, by the Internet access service providing unit, a user code in a user related information field of a packet provided from the application service providing unit;

extracting, by the Internet access service providing unit, interception information from the packet when the same code as the user code received from the interception unit is included; and transferring, by the Internet access service providing unit, the extracted interception information to the interception unit;

wherein the interception information includes communication data and communication connection information containing an Internet application service, a user identifier (ID), an Internet protocol (IP) address allocated to the interception target.

2. The method of claim 1, prior to the receiving of the interception request, further comprising:

generating, by the application service providing unit, a user code with respect to users using the Internet service.

3. The method of claim 2, further comprising:

updating, by the application service providing unit, the user code at predetermined intervals.

4. The method of claim 1, wherein:

the user related information includes the user code and an application service providing unit code.

5. The method of claim 1, wherein the extracting of the interception information further comprises storing the packet including the same code as the received user code.

6. A system for a lawful interception of an Internet service, the system comprising:

an interception unit for storing a legal right for an interception of a packet, and requesting an interception with respect to an interception target;

an application service providing unit transferring a user code with respect to the interception target to the interception unit when an interception request is received from the interception unit; and an Internet access service providing unit for lawfully intercepting the packet when the interception request is received from the interception unit, and extracting interception information from the packet containing the user code, and providing the interception information to the interception unit;

wherein the interception unit comprises: a right storage unit obtaining and store the legal right; an interception requesting unit requesting the application service providing unit for an interception by including interception target information with respect to the interception target, and requesting the Internet access service providing unit for an interception by including the user code received from the application service providing unit; and a user code receiver storing the user code received from the application service providing unit;

wherein the application service providing unit comprises: a user code generator periodically generating a user code with respect to a user using the Internet service, and transferring, to the interception unit, a user code corresponding to the interception target information when an interception request is received from the interception unit; a user code insertion unit inserting user related information containing the user code into a user related information field of a packet to be transferred to the interception target when the interception request is received from the interception unit; and a data storage unit storing the user code generated by the user code generator.

7. The system of claim 6, wherein the user related information field is positioned in an option field of an Internet protocol packet.

8. The system of claim 6, further comprising:

a network probe lawfully intercepting the packet when the interception request is received from the interception unit, extracting interception information from the packet containing the user code, and providing the extracted interception information to the interception unit.

* * * * *